United States Patent [19]

Sugi et al.

[11] Patent Number: 4,491,373
[45] Date of Patent: Jan. 1, 1985

[54] CONSTRUCTION OF THE MATING SLIDING MEMBERS IN A LINEAR FEEDING MEANS

[75] Inventors: Hiromi Sugi, Ayase; Kyozaburo Furumura, Ninomiya; Hiromitsu Asai, Fujisawa, all of Japan

[73] Assignee: Nippon Seiko Kabushiki Kaisha, Tokyo, Japan

[21] Appl. No.: 526,560

[22] Filed: Aug. 25, 1983

[30] Foreign Application Priority Data

Aug. 25, 1982 [JP] Japan .............. 57-128381[U]
Mar. 14, 1983 [JP] Japan .............. 58-36448[U]
Apr. 8, 1983 [JP] Japan .............. 58-61956

[51] Int. Cl.³ ............... F16C 29/00; F16C 32/06
[52] U.S. Cl. .................................................. 308/5 R
[58] Field of Search ............. 308/5 R; 384/292, 293, 384/118, 115, 113

[56] References Cited

U.S. PATENT DOCUMENTS

| | | | |
|---|---|---|---|
| 1,674,453 | 6/1928 | Sloper | 384/292 |
| 1,882,956 | 10/1932 | Sandler | 384/293 |
| 4,141,603 | 2/1979 | Remmers et al. | |
| 4,457,566 | 7/1984 | Mohsin | 308/5 R |

Primary Examiner—Lenard A. Footland
Attorney, Agent, or Firm—Basile, Weintraub & Hanlon

[57] ABSTRACT

In an assembly of linear feeding means in which a carrying or carriage member is supported on a rod shaped supporting member and these two members can be relatively moved in lengthwise direction, a plurality of recesses each having a shape or arrow head are disposed such that the tip end of each of the arrow head type recesses is directed to either one direction or to the other opposite direction of the relative movement of the assembly.

By virtue of this construction, hydrodynamic pressures are directed in both directions as to ensure smooth running of the assembly.

15 Claims, 24 Drawing Figures

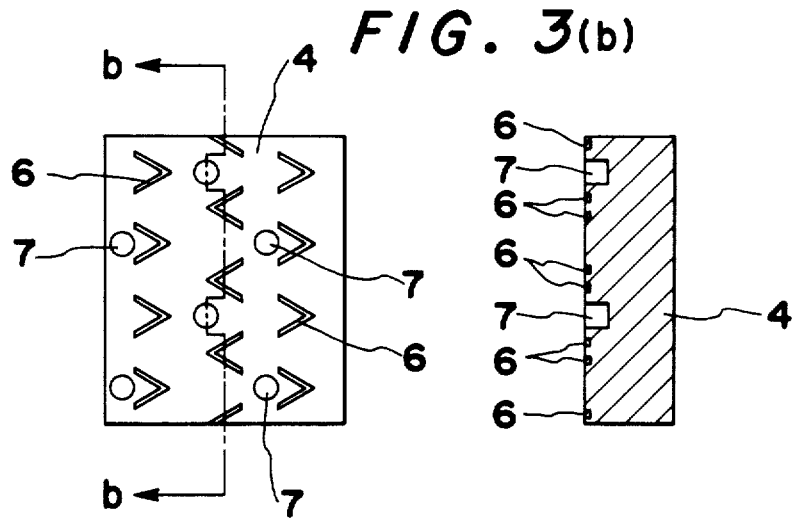
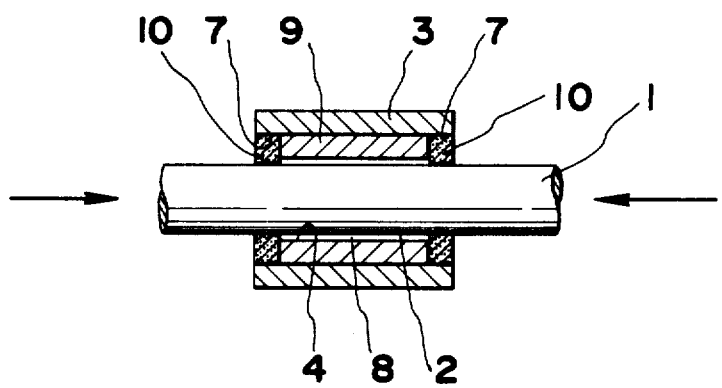

FIG. 8 (a)
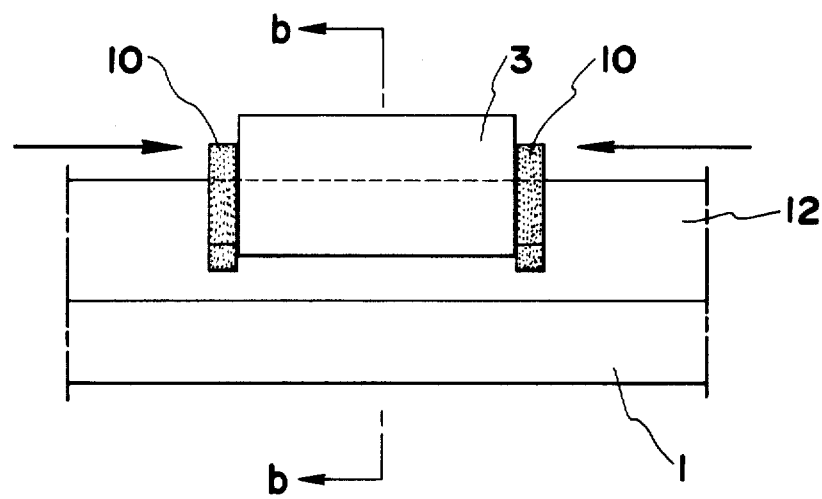
FIG. 8(b)   FIG. 8(c)
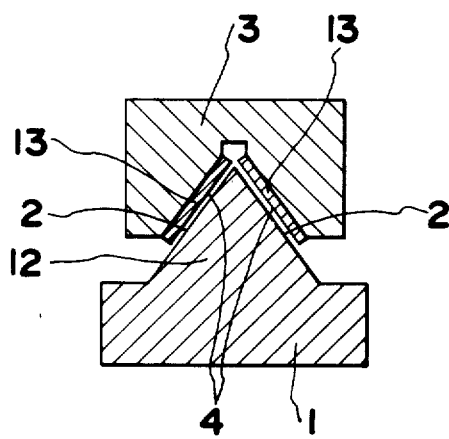 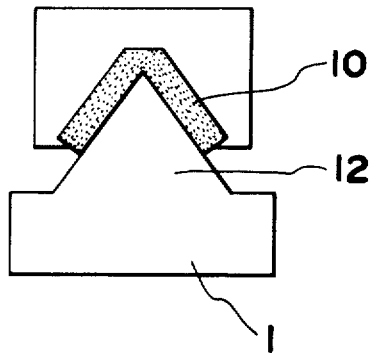

4,491,373

CONSTRUCTION OF THE MATING SLIDING MEMBERS IN A LINEAR FEEDING MEANS

BACKGROUND OF THE INVENTION

1. Field of the Invention

The present invention relates to the construction of two mating sliding parts in a linear feeding means. More particularly this invention concerns a linear feeding assembly, wherein a carriage member is supported on or around a linear supporting member and these two members are relatively and slidably movable in the lengthwise direction of the supporting member. A number of recesses of arrow head patterns for generating hydrodynamic pressure are arrayed on either one of or both of the sliding faces in the direction of movement, such that the arrow heads are directed both normal and reverse to the direction of movement, to generate hydrodynamic pressure in both directions, for assuring smooth movement in both directions.

2. Description of the Prior Art

The construction of the two mating sliding members of a conventional linear feeding means has been of the type wherein a carriage member is attached on or around the sliding face of the rod-shaped supporting member used for slidable movement. Particularly, in linear feeding means for feeding a carriage of a printer which is one of the office automation apparatuses required to repeat very rapid reciprocal movement, the manner of lubrication has been accomplished by applying a sufficient amount of lubricant to the sliding surfaces. In many cases, a major part of the sliding face of the rod shaped supporting member has been exposed outside the area of mutual fit with the carriage member, and most of the lubricant has been applied to the exposed portion with the accompanying liable chance of contaminating the interior of the device. Thus, it has long been desired to apply a minimum amount of lubricant to keep the interior of the device clean. For this purpose, it is also desired to attain satisfactory lubrication with as small an amount of lubricant as possible.

As explained herein before, since the linear feeding means comprises a long rod-shaped carriage member, a major part of which is exposed outside the mutual fit with the carriage member, it has been difficult to obtain satisfactory lubrication unless large amounts of lubricant is applied thereto.

In view of these problems, the inventors have accomplished the present invention. Prior art devices known to the inventors are disclosed in U.S. Pat. No. 4,141,603 and Japanese Utility Model Laid-Open Publication No. 54-150044 both relating to bearings.

Since these prior art devices are either a journal bearing which does not move in its axial direction or a thrust bearing in which the bearing surface is not exposed and thus the lubricant applied therein is not exposed, there has been almost no fear of contamination of the applied lubricant. In addition, it has not been required to apply lubricant in large amounts. Accordingly, these prior art devices are not relevant to the subject matter of the present invention.

As mentioned above, the present invention aims to solve such pending problems in linear feeding devices. It is therefore an object of the present invention to depress the working noise and friction between two mating sliding faces. Another object of the present invention is to provide a novel construction of the mating slide faces of the linear feeding means which functions smoothly over an entire operating range with no lubricant at all or with very small amounts of lubricant. A further object of the invention is to provide novel mating slide faces of the linear feeding means which can secure the necessary and sufficient amount of lubricant.

SUMMARY OF THE INVENTION

In order to attain the objects as stated above, the present invention comprises at least one of the two mating slide faces of a rod-shaped slide face and a carrying or carriage member having a plurality of patterns of grooves or recesses for generating hydrodynamic pressure. Each groove is shaped like an arrow head with the tip end of the respective arrow heads being directed either in one direction of the movement of the carrying or carriage member or in the other direction and arrayed along the relative reciprocal movement of the device.

Either one of the sliding surfaces is provided with a plurality of arrow head-shaped patterns of grooves or recesses for generating hydrodynamic pressure, in such a manner that the tip end of respective arrow head is directed either to one direction or to the other direction of the relative movement of the two mating members consisting of the rod-shaped supporting member and the carrying or carriage member and yet being arranged along the relative reciprocal movement of the two members. Because of this arrangement, the mutual friction between sliding surfaces of the two members is prevented by virtue of the floating function owing to the hydrodynamic pressure, however violently the two members may reciprocate or which ever direction they may relatively move.

Accordingly, durability of the device can be remarkably increased and the working noise can also be depressed.

In addition, one or more sumps or recesses for retaining lubricant are provided either at both axial ends or between the recesses into which a porous material is filled to ensure retaining of the lubricant, if it is required. By virtue of these recesses, even if it becomes necessary to supply a lubricant, the amount of such lubricant can be reduced to as small an amount as practicably possible without requiring such a large amount thereof as to make the device dirty.

In a typical manner of relative movement between the rod-shaped supporting member and the carrying or carriage member, the carrying or carriage member traverses reciprocally while being guided by the rod shape supporting member fixedly extending in the body of the device. However, in some cases, a rod-shape supporting member may reciprocate while being guided by the fixed carrying member, and this type of relative movement is intended to be included in the category of this invention.

BRIEF DESCRIPTION OF THE DRAWINGS

The description herein makes reference numerals refer to like parts throughout the several views and wherein:

FIG. 3(a) is a developed view of the sliding surface of carrying member of a third embodiment of the present invention wherein a plurality of recesses for retaining lubricant are formed between the arrays of the recesses for generating hydrodynamic pressure, FIG. 3(b) is a cross sectional view taken along line b—b of FIG. 3(a), FIG. 4, illustrates a cross sectional view of a fourth embodiment of the present invention wherein an annular recess is formed at each axial end of the carrying member into which a porous material is being filled, FIG. 8(a) is a front view of a rod-shaped supporting member having a guide rail like a pyramid in cross section and a carriage member mounted thereon and provided at both lengthwise ends with porous members, FIG. 8(b) is a cross sectional view taken along line b—b of FIG. 8(a), FIG. 8(c) is an end view showing a rod-shaped supporting member having a guide rail with a pyramid like projection in cross section and a carriage member mounted thereon provided with a porous member at its one end.

DESCRIPTION OF THE PREFERRED EMBODIMENTS

Figure 1C:
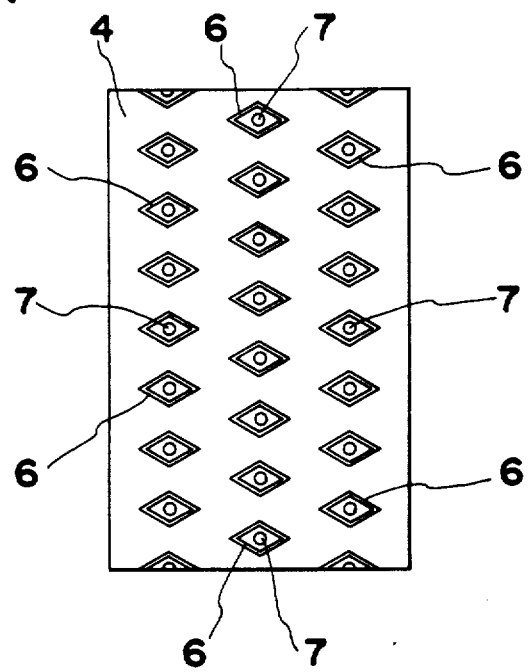
FIG. 1(b) through FIG. 1(d) are developed views of the sliding surface of respective carrying member shown in FIG. 1(a)
Figure 1D:
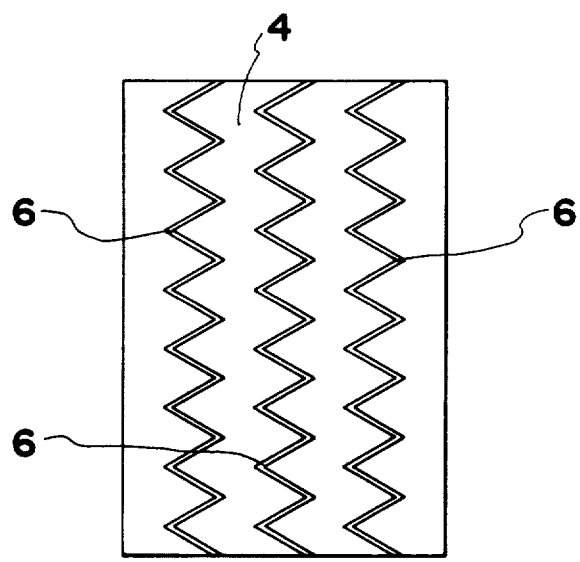
Figure 1A:
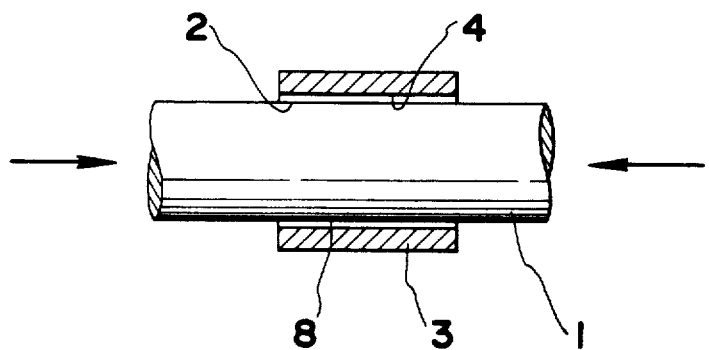
FIG. 1(a) is a cross sectional side elevated view of one example of the present invention in the form of a linear feeding device.

FIG. 1(a) shows an example of a linear feeding means. In FIG. 1(a) a supporting member 1 of a round bar shape is held by a carrying member 3 fitted loosely around its outer sliding surface 2 with a slight clearance 8 of the order of from several $\mu$m to 200 $\mu$m for permitting mutual slidable movement. In this instance, the carrying member 3 is fixed, while the rod-shaped supporting member 1 is reciprocally movable in lengthwise direction, namely axially, as shown in the drawing.

Figure 1B:
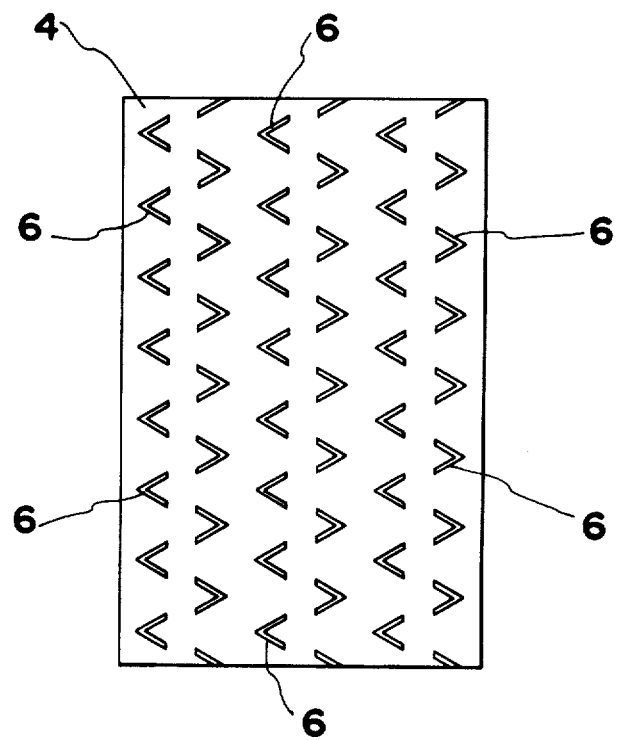

On the sliding surface 4 of this carrying member 3, a plurality of recesses 6 for generating hydrodynamic pressure having a configuration selected from the patterns shown by FIG. 1(b) to FIG. 1(d) and having a depth of from several $\mu$m to 10 $\mu$m.

In FIG. 1(b), recesses 6 comprise a plurality of arrow head like shaped grooves formed on the sliding surface 4 of the carrying member 3 and at a portion between the two axial ends and within the stroke of the carrying member 3. The tip ends of these arrow head like grooves 6 are directed, as shown in FIG. 1(a), in the direction either normal or reverse to the travel of the member 1 and also equal in number. The example shown in FIG. 1(c) comprises a number of rhombuses formed by a pair of oppositely directed arrow head like grooves on the same level and contiguous to each other on the sliding surface 4 of the carriage member 3 to constitute a number of rhombus shape recesses 6, 6 for generating hydrodynamic pressure, and in this case a recess 7 for retaining lubricant is engraved in each of the rhombus shaped grooves on the sliding surface 4 of the carrying member 3. FIG. 1(d) shows an example, recesses 6, 6 for generating hydrodynamic pressure are fored by a series of zigzag grooves being continuous around the periphery of the sliding surface 4.

In this case, lubricant to be supplied can be either one of grease or other lubricating material or merely the air.

According to the linear feeding means as stated above, when the rod-shaped supporting member 1 travels to the left of FIG. 1(a), there arises a hydrodynamic pressure at the sharp tip end of each recess 6 directed to the direction the same as the direction of travel, due to a kind of pumping action resulting in increase of pressure at the point, thereby the rod-shaped supporting member can be slidably supported by a fluid film of lubricant which flows into the gap defined between the sliding face 4 of the carrying member 3 and the sliding surface 2 of the rod-shaped supporting member 1. When the rod-shaped supporting member 1 moves to the right opposite to that stated above, similarly, a hydrodynamic pressure is generated at the tip end of each arrow head shaped recess 6 due to pumping action, thus increasing the pressure at the point, thereby slidably supporting the rod-shaped supporting member 1 by means of a fluid film of lubricant which flows out into the gap 8 defined between the sliding surface 4 of the carrying member 3 and the sliding surface 2 of the rod-shaped supporting member 1.

As stated above, by constituting such recesses 6, during the relative movement of the rod-shaped supporting member 1 to the carrying member 3, their sliding surfaces 2 and 4 are secured in floating condition to prevent occurrence of excessive friction. In addition, even when grease or other lubricating oil is used, such lubricating material will not flow out excessively. Thus the amount of such lubricant can be kept to a minimum with no fear of contaminating the device with excess lubricant.

Figure 2A:
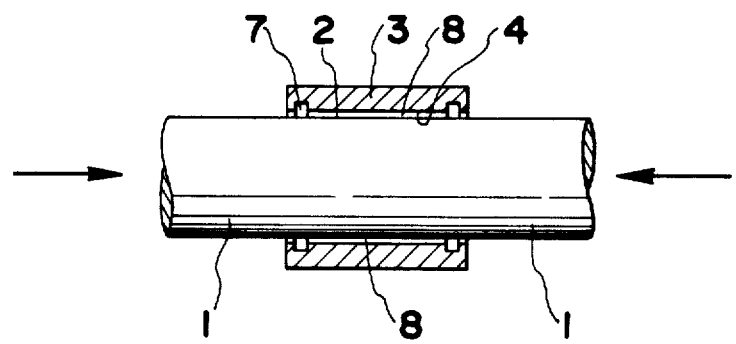
FIG. 2(a) shows a cross sectional side elevational view of a second embodiment of the present invention wherein an annular recess is formed at each axial end of a carrying member.
Figure 2B:
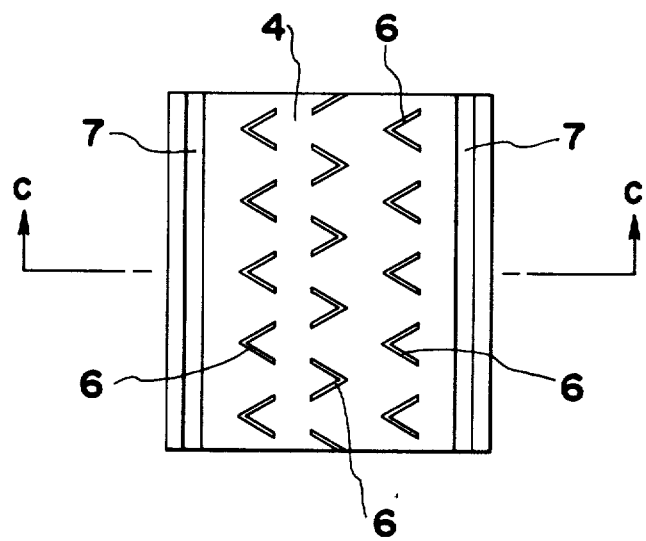
FIG. 2(b) is a developed view of the sliding surface of the carrying member illustrated in FIG. 2(a)

Shown in FIG. 2 is an example having an annular recess 7, for retaining lubricant which has a depth larger than that of the recesses 6 for generating hydrodynamic pressure. Annular recesses 7 are formed at each axial end of the carrying member 3. When the rod-shaped supporting member 1 and the carrying member 3 are assembled together, they are interposed by a slight gap or clearance 8 between the two facing sliding surfaces 2 and 4, as shown in FIG. 2(a).

Figure 2C:
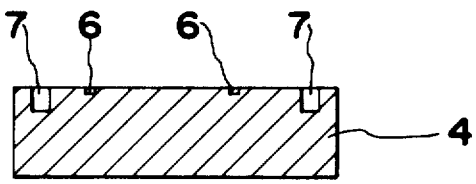
FIG. 2(c) is a cross sectional view taken along line c—c of FIG. 2(b)

At both axial ends of the carrying member 3 in the direction of movement, an annular recess 7 for retaining lubricant having a depth larger than that of the recess for generating hydrodynamic pressure is formed (refer to FIG. 2(c)). And at the portion between the two recesses 7 of the carrying member 3, are formed a number of recesses 6, for generating hydrodynamic pressure, having a configuration in the shape of an arrow head and being arrayed in two series one in the direction to the right.

The device according to this example also functions in a manner similar to that in the aforesaid example, so the rod-shaped supporting member 1 can be floated.

FIG. 3 shows an example, wherein one or more of recesses 7 for retaining lubricant are formed among the arrays of the recesses 6 for generating hydrodynamic pressure. As shown in FIG. 3(a) and FIG. 3(b), recesses 7 are round holes with bottom and being formed between the arrays of said recesses 6 in suitable number. Of course, they are disposed to coincide with both the leftward and rightward direction of the movement of the device.

Other functions of the device of this example is substantially the same as the examples stated above.

In the linear feeding device shown in FIG. 4, a carrying member 3 is attached with its sliding surface 4 around the sliding surface 2 of a rod-shaped supporting member 1, and the supporting member 1 is movable in both directions left and right as shown in arrow marks in the drawing. Of course in this example, too, the arrow head-shaped recesses (not shown) can be selected from the patterns as in Example 1.

The sliding surface 4 of the carrying member 3 of this example is formed on the inner surface of a slide bearing member 9 slightly shorter than the outer member of the carrying member 3 and is interposed by a minor gap 8 with respect to the sliding surface 2 of the rod-shaped supporting member 1. At each end of the two opposite axial ends in the direction of linear movement of the carrying member 3 a recess 7 substantially in the form of annular step is formed, into which a porous member 10 is filled so as to be impregnated with any suitable lubricating oil.

Thus, the device of this example comprises recesses for generating hydrodynamic pressure each having the shape of an arrow head on the sliding surface 4 of the carrying member 3 as shown in the foregoing examples.

When the rod-shaped supporting member 1 travels in either direction, as shown by arrow marks in the drawing right or left, lubricating material is supplied being developed from the porous member 10 to the gap 8 formed between two mating sliding surfaces 2 and 4 and a hydrodynamic pressure is generated during the travel of the supporting member, thereby the rod-shaped supporting member 1 is held floating with respect to the sliding surface 4 of the carrying member 3.

Figure 5:
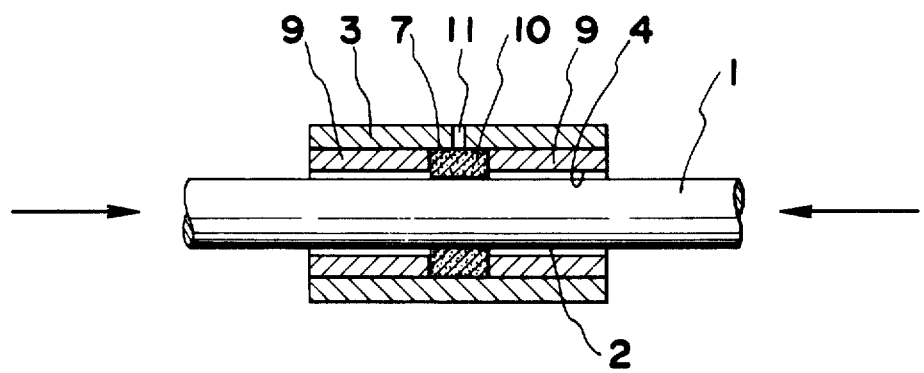
FIG. 5 is a cross sectional view of a sixth embodiment of the present invention wherein an annular recess is formed at the lengthwise middle part of the carrying member into which a porous material is being filled.

The linear feeding device shown in FIG. 5 shows the sliding surface 2 of the rod-shaped supporting member 1, with a carrying member 3 at the sliding surface 4 thereof, so that the rod-shaped supporting member 1 can travel either directions, left or right, as shown by the arrow lines in the drawing. Of course, in this example too, arrow head shaped recesses (not shown) are formed by selecting the pattern of the recesses in a manner as shown in FIG. 1(b)-(d).

In this example, the sliding surface 4 of the carrying member 3 is composed of the inner faces of the two pieces of bearing members 9 each having a length shorter than a half of the outer member of the carrying member 3, and the confronting lengthwise ends of these bearing members 9 are spaced apart from each other.

The space between the two bearings 9 constitute annular recesses 7 for reserving lubricant material, into which porous material 10 is received so as to be impregnated with any suitable lubricating oil.

Between the sliding surface 4 of the carrying member 3 and the sliding surface 2 of the rod-shaped supporting member 1, a slight gap 8 is maintained.

In FIG. 5, numeral 11 denotes a through hole for supplying lubricant.

Also in this example, a plurality of arrow head-shaped recesses for generating hydrodynamic pressure (not shown) are formed on the sliding surface 4 of the carrying member 3 in the same manner as explained in other examples already mentioned.

When the rod-shaped supporting member 1 moves in either directions to the left and right, lubricant is supplied being developed from the porous material 10 to the gap 8 formed between the confronting surfaces 2 and 4 and there arises a hydrodynamic pressure, so the rod-shaped supporting member 1 is floated with respect to the sliding surface 4 of the carrying member 3.

Figure 6:
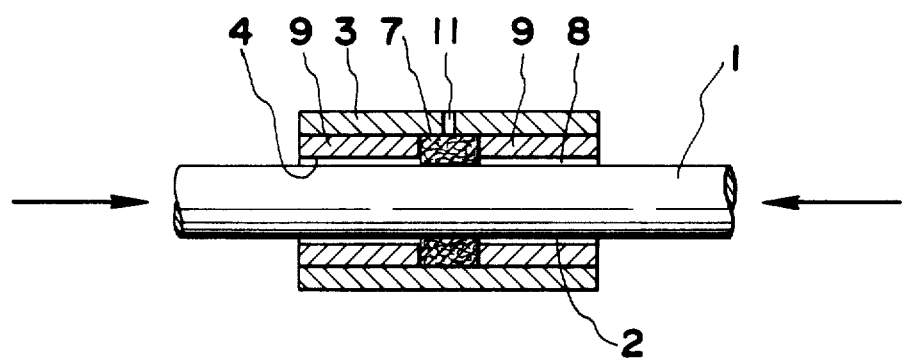
FIG. 6 is a cross sectional view of an embodiment wherein an annular recess is formed at the lengthwise middle part of the carrying member into which a grease like material is being filled.

In the linear feeding device shown in FIG. 6, a carrying member 3 is attached on the sliding surface 2 of the rod-shaped supporting member 1 with the sliding surface 4 of the carrying member 3 facing the sliding surface 2, and the rod-shaped supporting member 1 can move either direction, left and right as shown by the arrow marks. Of course, in this example too, arrow head-shaped recesses for generating hydrodynamic pressure (not shown) are formed by selecting the pattern of the recesses as in FIG. 1(b)-(d) already mentioned. The sliding surface 4 of the carrying member 3 of this example consists of inner surfaces of the two bearing member 9 each having a length shorter than a half of the outer member of the carrying 3 and these two bearing members are spaced apart each other at their confronting end faces.

Between the two end faces thus spaced apart, an annular recess 7 is defined into which a suitable lubricant such as grease is filled.

A small gap 8 is maintained between the sliding surface 4 of the carrying 3 and the sliding surface 2 of the rod-shaped supporting member 1.

In FIG. 6 a through hole 11 for supplementing lubricant is shown. Though not depicted, also in this example, arrow head shaped recesses for generating hydrodynamic pressure are formed in a similar manner as stated in the foregoing examples.

If the rod shaped supporting member 1 moves to either direction as shown by arrow lines, the lubricant retained therein is developed from the porous material 10 to the gap 8 defined between the two sliding surfaces 2 and 4. This creates a hydrodynamic pressure at the time when the supporting member 1 moves so that it can be floated with respect to the sliding surface 4 of the carrying member 3.

Figure 7A:
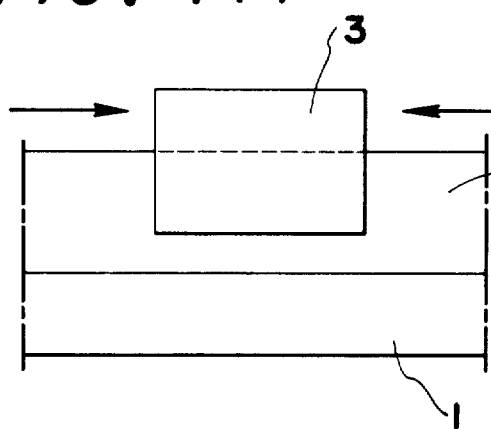
FIG. 7(a) is an end view showing an example of a rod-shaped supporting member having a guide rail with a projection shaped in the form of a pyramid in cross section.
Figure 7B:
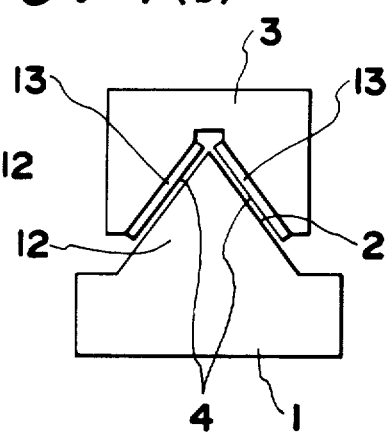
FIG. 7(b) is an end view of the rod-shaped supporting member shown in FIG. 7(a)

In the example shown by FIG. 7(a) and FIG. 7(b), the rod-shaped supporting member 1 is constructed as a supporting table the upper part of which is formed as a guide rail or a saddle 12 having a shape like a pyramid or a spire in cross section when taken normal to the direction of travel of the device. The carriage member 3 is mounted thereon so as to be able to travel either to the left or to the right as shown by the arrow marks in the drawings. In other words, in this example, the sliding surface 2 of the supporting member 1 is formed as two sloped side walls of the guide rail or saddle 12 and the sliding surface 4 of the carriage member 3 is formed as the lower face of the pair of slide plates 13 attached to the bottom of the carriage constitute a pair of faces corresponding to the side walls of the guide rail 12.

On the sliding faces 4 of the carriage member 3, a plurality of arrow head shaped recesses (not shown) for generating hydrodynamic pressure are formed in such a manner that the sharp end of the arrow heads coincide with the directions of the movement of the device.

When the carriage member 3 travels in either direction as shown by the arrow marks in the drawing, hydrodynamic pressure is generated at the sharp tip end of the recesses, so that the carriage member 3 is floated relative to the rod-shaped supporting member 1 in the form of a supporting table.

In the example shown by FIG. 8(a), FIG. 8(b) and FIG. 8(c), the rod-shaped supporting member 1 is formed as a supporting table the upper part of which is formed to constitute a guide rail or saddle 12 having a shape similar to a pyramid or a spire in cross section taken normal to the direction of movement of the device. The carriage member 3 is mounted as if riding thereon so as to be guided to travel in either direction to the left or right as shown by arrow marks in the drawings. Namely, in this example, the sliding surface 2 of the rod-shaped supporting member 1 is formed as a pair of tapered side walls 2 of the guide rail or saddle 12, while the sliding surface 4 of the carriage member 3 is formed as a pair of tapered convex lower faces of the pair of slide plates 13 fixed to the lower end face of the carriage member 3. On the sliding faces 4 of the carriage member 3, a plurality of recesses (not shown) for generating hydrodynamic pressure are formed such that the tip point of the arrow heads are directed to either direction of the movement of the device. In FIGS. 8(a) and (c), numeral 10 denotes porous members into which a suitable lubricant is impregnated.

When the carriage member 3 travels either to the left or right the lubricant is introduced between the two mating sliding faces 2 and 4 to form a fluid film and creates hydrodynamic pressure at the tip end of the arrow head shaped recesses, so the carriage member 3 is floated with respect to the sliding faces of the rod shaped supporting member in the form of a guide rail.

Figure 9A:
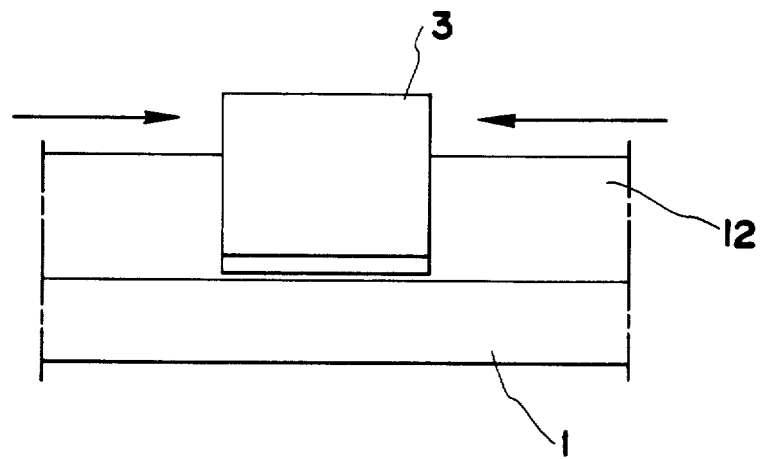
FIG. 9(a) is a front view of a rod-shaped supporting member having a projected sliding portion rectangular in cross section.
Figure 9B:
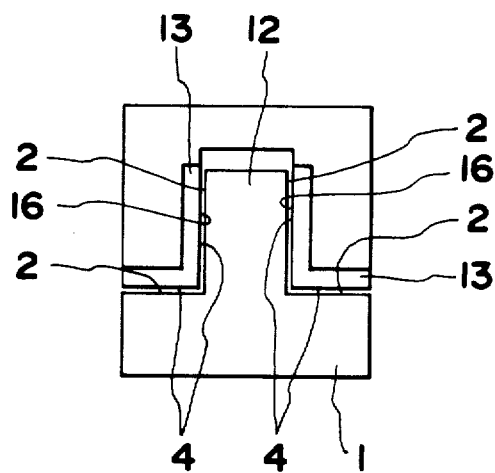
FIG. 9(b) is an end view of an example wherein a rod-shaped supporting member has a projected sliding portion rectangular in cross section.

The example shown by FIG. 9(a) and FIG. 9(b) also comprises a supporting member 1 in the form of a supporting table the upper part of which is formed as a guide rail 12, rectangular in cross section taken normal to the direction of movement of the device, a carriage member 3 mounted on the guide rail 12 as if riding thereon so as to be guided to move in either direction as shown by the arrow marks in the drawings, to the left or right. In this example, the sliding surface 2 of the rod-shaped supporting member 1 is composed of a pair of upstanding walls and two flat base faces of the guide rail 12, while the sliding surface 4 of the carriage member 3 is formed as a pair of inner side faces of the slide plates 13 fixed to the lower face of the carriage member 3. The slide plates 13 are formed in L shape to fit the sliding faces 2 stated above.

On the sliding surface 4 of the carriage member 3, a plurality of arrow head shaped recesses (not shown) for generating hydrodynamic pressure are formed as stated previously such that the tip end of arrow heads are directed to the movement of the device.

When the carriage member 3 moves either to the left or right as shown by the arrow marks in the drawings, there is generated a hydrodynamic pressure to the direction toward the tip end of the arrow heads and the carriage member 3 is floated to the rod-shaped supporting member 1 in the form of a supporting table.

Figure 10A:
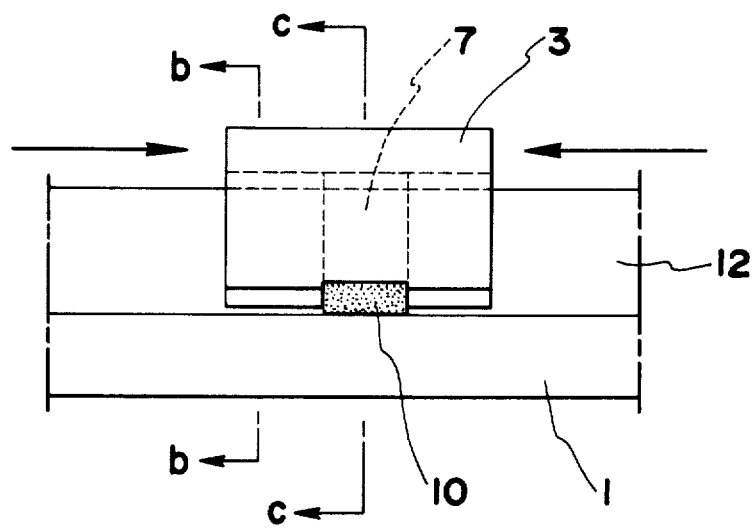
FIG. 10(a) is a front view of an example wherein a rod-shaped supporting member comprises a guide rail having a projecting sliding face rectangular in cross section and provided at the lengthwise middle portion with a porous member.
Figures 10B, 10C:
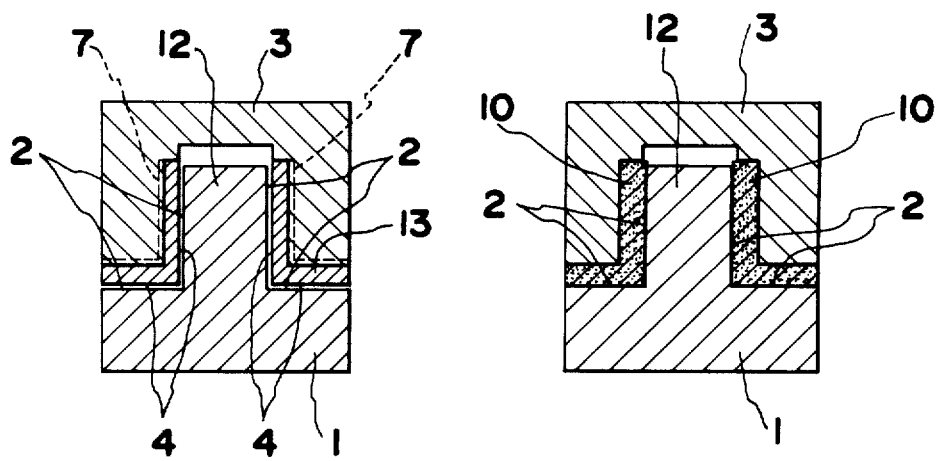
FIG. 10(b) is a cross sectional view taken along line b—b of FIG. 10(a)
FIG. 10(c) is a cross sectional view taken along line c—c of FIG. 10(a)

In the example shown by FIG. 10(a), FIG. 10(b) and FIG. 10(c), the rod-shaped supporting member 1 is formed as a supporting table the upper part of which is formed as a guide rail 12, rectangular in cross section taken normal to the direction of movement of the device.

The carriage member 3 is mounted to ride on the guide rail 12 so as to be guided thereby to move in either direction as shown by the arrow lines in the drawings. According to this example, the sliding surface is composed of two upstanding side walls and two flat base portions, while the sliding surface 4 of the carriage member 3 is formed on the lower faces of the slide plates 13 fixed to the lower faces of the slide plates 13, 13 fixed to the lower face of the carriage member 3. These slide plates 13 are formed in L shape to fit the sliding surfaces of the supporting table as the supporting member 1, and yet each of these slide plates is formed to have a length shorter than a half of the length of the carriage member 3. Two pieces of slide plates are disposed at one lengthwise side of the guide rail 12 being spaced apart each other, similarly, the other two pieces at opposite lengthwise side, namely, at the reverse side of the paper. In this way, a recess 7 is defined between the confronting slide plates 13 into which a porous member 10 is filled so as to be impregnated with suitable lubricant such as grease or the like.

On the sliding surfaces 4 of the carriage member 3, a plurality of recesses (not shown) for generating hydrodynamic pressure are formed such that each sharp tip end of the arrow head of the recesses is directed to the movement of the device.

When the carriage member 3 travels in either direction as shown by arrow marks in the drawing, a hydrodynamic pressure is generated toward the tip end of the arrow heads, so the carriage member 3 is floated with respect to the sliding surface of the rod-shaped supporting member 1.

Figure 11A:
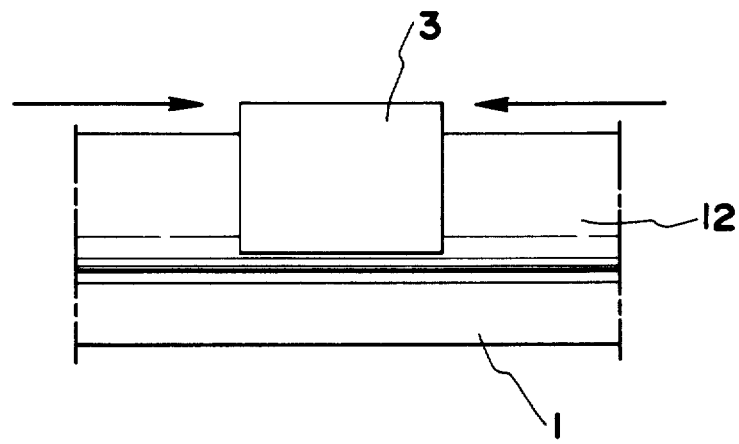
FIG. 11(a) is a front view showing an example wherein a rod-shaped supporting member comprises a projecting sliding part having a configuration of an arc in cross section when taken normal to the direction of reciprocal movement.
Figure 11B:
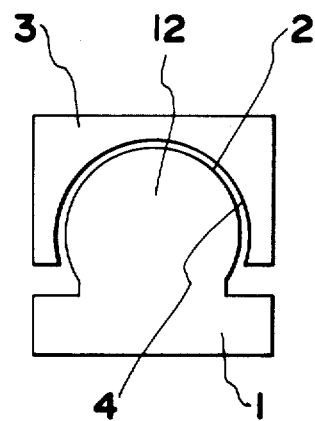
FIG. 11(b) is a front view of an example provided with a porous member at the middle part and the rod-shaped supporting member thereof comprises a projected sliding portion having a configuration like an arc in cross section when taken normal to the direction of reciprocal movement.

In this example shown by FIG. 11(a) and FIG. 11(b), the rod-shaped supporting member is formed as a supporting table, the upper part of which is formed as a guide rail 12 of arched shape in cross section when taken normal to the direction of movement of the device. A carriage member 3 is mounted to the guide rail 12 as if it rides on the guide rail 12 and is guided in either direction as shown by the arrow marks in the drawing. In this example, the sliding surface 2 of the rod-shaped supporting member 1 is formed on the arched face of the guide rail 12 and the sliding surface 4 of the carriage member 3 is formed in the shape of arch corresponding to the sliding face 2. On the sliding surface 4 of the carriage member 3, a plurality of arrow head shaped recesses (not shown) for generating hydrodynamic pressure are formed as shown in FIGS. 1(b)-(c) such that the tip end of each recess coincides with the direction of movement of the device.

When the carriage member moves in either direction as shown by arrow marks in the drawing, a hydrodynamic pressure is generated in the direction of the tip end of the arrow head of each recess, so the carriage member is floated with respect to the rod-shaped supporting member 1 in the form of the supporting table.

What is claimed:

1. A linear feeding means comprising, a rod-shaped supporting member and a carriage member slidably supported thereon for relative reciprocal movement in the lengthwise direction of said supporting member, wherein one of said members is provided with a plurality of arrow head shaped recesses for generating hydrodynamic pressure and each of the tip end of said recesses is disposed so as to be directed to either one direction or to the other opposite direction of the relative reciprocal movement of said supporting member and said carriage member.

2. The linear feeding means as defined in claim 1, wherein said arrow head shaped recesses for generating hydrodynamic pressure are spaced apart each other along either directions of the relative reciprocal movement of said linear feeding means.

3. The linear feeding means a defined in claim 1, wherein each of the arrow head shaped recesses for generating hydrodynamic pressure is disposed such that each of the tip end of the arrow head portion of the recesses is directed to either one direction or to the other opposite direction of the relative reciprocal movement of said supporting member and said carriage member and being connected with each other to form a series of continuous grooves and arrayed along the relative reciprocal movement of the linear feeding means.

4. The linear feeding means as defined in claim 1, further comprising annular recesses for retaining lubricant having a depth larger than the depth of said arrow and head shaped recesses and disposed at one axial end and on the sliding surfaces of at least one of said supporting member and said carriage member.

5. The linear feeding means as defined in claim 1, further comprising a recess for retaining lubricant having a depth larger than the depth of said arrow head shaped recesses and formed at the intermediate portions of at least one of said supporting member and said carriage member between said arrow head shaped recesses.

6. The linear feeding means as defined in claim 1, further comprising an annular recess for retaining lubricant having a depth larger than that of said arrow head shaped recesses and formed on said sliding surface of at least one of said supporting member and said carriage member and each of said former recesses receives therein a porous member.

7. The linear feeding means as defined in claim 1, further comprising an annular recess for retaining lubricant having a depth larger than that of said arrow head shaped recesses and formed on the sliding surface of at least one of said supporting member and said carriage member and at a portion between said arrow head shaped recesses, said annular recess receiving therein a porous member.

8. The linear feeding means a defined in claim 1, wherein said supporting member is formed as a supporting table.

9. The linear feeding means a defined in claim 1, wherein said supporting member is formed as a supporting table and said sliding surface is formed as having arched face in cross section when taken normal to the direction said reciprocal movement.

10. The linear feeding means as defined in claim 1, wherein said supporting member is formed as a supporting table (guide rail) and said sliding surface is formed as a projection having a pyramidal (triangular) shape in cross section when taken normal to the direction of said reciprocal movement.

11. The linear feeding means as defined in claim 10, wherein a recess or a pair of recesses for retaining lubricant are disposed on said sliding surface either at the middle part or at both lengthwise end of said carriage member in the direction of said relative reciprocal movement and yet a porous member is received in said recess or recesses.

12. The linear feeding means as defined in claim 10, wherein a recess or a pair of recesses retaining lubricant are disposed on said sliding surface either at the middle part or at both lengthwise ends of said carriage member in the direction of said relative reciprocal movement.

13. The linear feeding means as defined in claim 1, wherein said rod shaped supporting member is formed as a supporting table and said sliding surface is formed on the upper face of the upstanding guide rail having a rectangular shape in cross section when taken normal to the direction of said relative reciprocal movement.

14. The linear feeding means as defined in claim 13, wherein a recess or pair of recesses for retaining lubricating material are disposed on the sliding surface of said carriage member being supported on said guide rail either at the middle part or at both lengthwise ends of said carriage member in the direction of said relative reciprocal movement.

15. The linear feeding means as defined in claim 13, wherein a recess or a pair of recesses for retaining lubricating material are disposed on the sliding surface of said carriage member being supported on said guide rail either at the middle part or an both lengthwise ends of said carriage member in the direction of said relative reciprocal movement and yet a porous member is received in said recess or recesses.

* * * * *